US009400692B2

(12) United States Patent
Reed et al.

(10) Patent No.: US 9,400,692 B2
(45) Date of Patent: Jul. 26, 2016

(54) SYSTEM AND METHOD FOR MANAGING THE ALLOCATING AND FREEING OF OBJECTS IN A MULTI-THREADED SYSTEM

(71) Applicant: Software AG, Darmstadt (DE)

(72) Inventors: Christopher Reed, Newmarket (GB); Mark Horsburgh, Cambridge (GB)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/496,288

(22) Filed: Sep. 25, 2014

(65) Prior Publication Data

US 2016/0092273 A1    Mar. 31, 2016

(51) Int. Cl.
 *G06F 9/46* (2006.01)
 *G06F 9/50* (2006.01)
 *G06F 9/52* (2006.01)

(52) U.S. Cl.
 CPC .............. *G06F 9/5016* (2013.01); *G06F 9/466* (2013.01); *G06F 9/52* (2013.01)

(58) Field of Classification Search
 CPC .................................. G06F 9/466; G06F 9/52
 USPC .................................................. 718/101, 104
 See application file for complete search history.

(56) References Cited

U.S. PATENT DOCUMENTS

| | | | | | |
|---|---|---|---|---|---|
| 5,057,996 | A | * | 10/1991 | Cutler | ................... G06F 9/4428 718/106 |
| 5,129,083 | A | * | 7/1992 | Cutler | ................... G06F 9/4428 |
| 5,187,790 | A | * | 2/1993 | East | .......................... G06F 9/52 718/107 |
| 5,321,841 | A | * | 6/1994 | East | ........................... G06F 9/52 710/240 |
| 5,875,461 | A | * | 2/1999 | Lindholm | ................. G06F 9/52 711/118 |
| 6,249,793 | B1 | * | 6/2001 | Printezis | ............. G06F 12/0269 |
| 6,427,195 | B1 | | 7/2002 | McGowen et al. | |
| 6,681,263 | B1 | * | 1/2004 | King | ..................... G06F 9/4435 707/999.202 |
| 6,792,601 | B1 | * | 9/2004 | Dimpsey | ................. G06F 9/443 710/200 |
| 6,832,228 | B1 | * | 12/2004 | Nock | ..................... G06F 9/5055 |
| 6,920,541 | B2 | * | 7/2005 | Kolodner | ............ G06F 11/3466 707/999.202 |
| 7,310,655 | B2 | * | 12/2007 | Dussud | ............... G06F 12/0269 707/700 |
| 7,433,928 | B1 | * | 10/2008 | Ranade | ................. H04L 67/104 709/213 |
| 8,539,155 | B1 | | 9/2013 | Miao et al. | |
| 2002/0147899 | A1 | * | 10/2002 | Lewis | ................. G06F 12/0269 711/170 |
| 2007/0288708 | A1 | * | 12/2007 | Saha | .................... G06F 9/30032 711/159 |
| 2012/0239871 | A1 | * | 9/2012 | Badam | ................ G06F 12/1425 711/104 |

OTHER PUBLICATIONS

Hudson et al., "McRT-Malloc—A Scalable Transactional Memory Allocator", 2006.*
Hans-J. Boehm, "Fast Multiprocessor Memory Allocation", 2000.*
(Continued)

*Primary Examiner* — Phillip H Nguyen
(74) *Attorney, Agent, or Firm* — Posz Law Group, PLC

(57) ABSTRACT

A memory management system for managing objects which represent memory in a multi-threaded operating system extracts the ID of the home free-list from the object header to determine whether the object is remote and adds the object to a remote object list if the object is determined to be remote. The memory management system determines whether the number of objects on the remote object list exceeds a threshold. If the threshold is exceeded, the system batch-removes the objects on the remote object list and then adds those objects to the appropriate one or more remote home free-lists.

18 Claims, 7 Drawing Sheets

(56) References Cited

OTHER PUBLICATIONS

Guangyu Chen, "Java Virtual Machine for Resource Constrained", 2006.*

Tamar Domani et al., "Thread-Local Heaps for Java", Proceedings of the 3rd international symposium on Memory management, pp. 76-87. New York, NY 2002.

* cited by examiner

SYSTEM AND METHOD FOR MANAGING THE ALLOCATING AND FREEING OF OBJECTS IN A MULTI-THREADED SYSTEM

TECHNICAL FIELD

The technical field relates in general to memory management more particularly to allocation and freeing of objects in a multi-threaded system.

BACKGROUND

Modern multi-CPU architectures can achieve very good performance if the majority of memory access is to that of memory in cache, or at least not in the cache of another CPU. If more than one CPU accesses the same memory address, or an address on the same cache line (typically 64 bytes), then this will provoke cache misses and cache contention, which not only limit per-thread throughput, but also reduce scalability.

As CPUs continue their trend of getting wider but not much faster, scalability becomes more important than "straight-line" performance. In recent years, the goal of "avoiding operations such as mutexes," while still having an element of truth, is better restated as "avoiding operations on mutexes that have contention." As applications change to accommodate the changing CPU landscape, applications are also tending to increase the number of threads that they use.

The number of CPUs available to a program can vary dramatically. The same program may be run in a constrained Virtual Machine environment, where only one or two CPU cores are available to it, or can be run in an architecture where it is expected to scale across large servers with over 100 processing cores. Operating systems have also become more sophisticated, using techniques such as maintaining affinity between threads and CPU cores automatically, and when allocating memory, being aware of the Non-Uniform Memory Architecture (NUMA) of the host, and thus allocating memory that is local to the CPU that is allocating it.

Memory allocators have a number of competing trade-offs to make and/or perform quickly for individual calls, to scale well across many threads, to be memory efficient, and they must behave correctly even when called from multiple threads concurrently. Further, it can be important to allocate memory in such a way that avoids problems such as false sharing, where two threads at the same time both use blocks of memory that reside in the cache line and thus provoke cache collisions. Applications may allocate memory on one thread, access it on that thread and free it on that thread, or may allocate on one thread and then later access the memory and free it from other threads. This is a common situation in message-passing applications.

U.S. Pat. No. 6,427,195 B1 describes a very widely used technique of having per-thread "free-lists". When allocating memory, if an object is available on the thread's local free-list, then a block of memory is removed from the free-list and returned to the application. When freeing a block of memory, it is added to the thread's free-list. A free-list has a maximum size and attempts to free when the free-list is full would then use a global allocation strategy, such as a global free-list, which may require taking locks which could be contended. Similarly, when allocating, if the local free-list is empty, a global allocation strategy is used ("Multi-arena" allocator in U.S. Pat. No. 6,427,195 B1).

Per thread pools that scale with the number of threads is an increasing trend. Thus, the amount of "cached" memory across all threads is increasing. This is memory that is held by the per-thread free-lists, and thus not being used to hold application data, but is not available for the operating system to re-use. Previous solutions can easily lead to a relatively large amount of cached memory across all threads. They also do not address the common use cases of transferring objects from one thread to another very well, as memory is allocated on producer threads and then freed on consumer threads. This results in the producer emptying its local free-list, and the consumer filling its free-list. As a consequence, there is excessive memory usage and decreased cache efficiency. When many threads are acting as consumers and producers in an application, there is no guarantee that a block of memory will be reused by the same threads or hardware CPU cores. Such schemes also encourage allocated blocks of memory to "migrate" across CPU cores, thus the CPU core that may become the primary user of a block of memory may not be the one that allocated the memory, and thus that CPU core may be using memory that is not local to the CPU. There are practical concerns as well with schemes such as those disclosed in U.S. Pat. No. 6,427,195 B1. These schemes require initializing and releasing data structures at the beginning and ending of every thread. This requires cooperation from the thread library and/or across all libraries within a process. This is difficult and cumbersome to do in a cross-platform way, and reduces the performance of starting threads and terminating threads.

SUMMARY

One or more embodiments discussed herein can address the aforementioned problems with traditional systems by improving memory caching performance of the malloc( ) and free( ) routines using a novel approach to local and global "free-lists." The present memory caching system uses shared thread affinity caches so that objects allocated on one thread and freed on a different thread are returned back to the originating "home" thread and local lists are not fixed to one thread, but more "loosely coupled."

Accordingly, one or more embodiments provide a method, system and/or non-transitory computer readable medium for the following. For example, a system may be comprised of a producer thread and consumer thread where the producer allocates objects, the application passes these objects to the consumer thread and the consumer thread frees the object. A method for memory management of objects which represent memory in a multi-threaded operating system can include, in response to a request by a consumer thread to free an object, which may have been allocated by a different thread, back to a free list of the objects, performing the following. Determining, by the processor, whether the object is identified as being remote to the consumer thread. adding, by the processor, the object to a local object free list of the consumer thread, when the object is determined to not be remote; adding, by the processor, the object to a remote object free list of the consumer thread, wherein the object on the remote object free list represents a foreign object that is freed and which is not available for re-use by the consumer thread, when the object is determined to be remote; determining, by the processor, whether an amount of objects on the remote object free list exceeds a threshold. When the number of objects on the remote object free list is determined to not exceed the threshold, the object is left on the consumer's remote object free list. When the number of objects on the remote object free list is determined to exceed the threshold: batch-removing, by the processor, the objects from the remote object free list; and adding, by the processor, the objects from the remote object list of the consumer thread to a home free-list of the producer thread from which the objects originated.

According to another embodiment, in response to a request by the producer thread to allocate memory, the following are performed. The processor determines whether there is any object in the local object free list of the producer thread, wherein the object in the local object free list represents a local object available to the producer thread. When there is determined to be an object on the local object free list of the producer thread, returning, to the producer thread, the object on the local object free list of the producer thread, for use by the producer thread in response to the request to allocate memory. When there is determined to be no object on the local object free list of the producer thread, the following are performed. The processor retrieves an object from a global allocator list which memorizes globally free memory. The processor adds an identifier to an object header of the retrieved object from the global allocator list, wherein the identifier identifies the local object free list of the producer thread; returns, to the consumer thread, the object from the global allocator list, for use by the producer thread in response to the request to allocate memory; and the producer thread uses the object returned from the request to allocate memory.

According to yet another embodiment, the object which is returned in response to the request to allocate memory is passed from the producer thread to the consumer thread, and then is the subject of the request by the consumer thread to free the object.

According to still another embodiment, wherein a home free-list for each of a plurality of threads, including the consumer thread and the producer thread, in the multi-threaded operating system contains a local object free list and a remote object free list.

In yet another embodiment, the request to free the object is a free memory request which is complementary to a request to allocate memory.

Still another embodiment includes, prior to freeing the object, the consumer thread receiving the object which is shared from the producer thread.

Yet another embodiment provides a non-transitory computer readable medium, which can perform a method according to one or more of these embodiments. Still another embodiment provides a computer system comprising a memory and a processor cooperatively operable with the memory, and configured to, based on instructions stored in the memory, perform such a method.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

Figure 1:
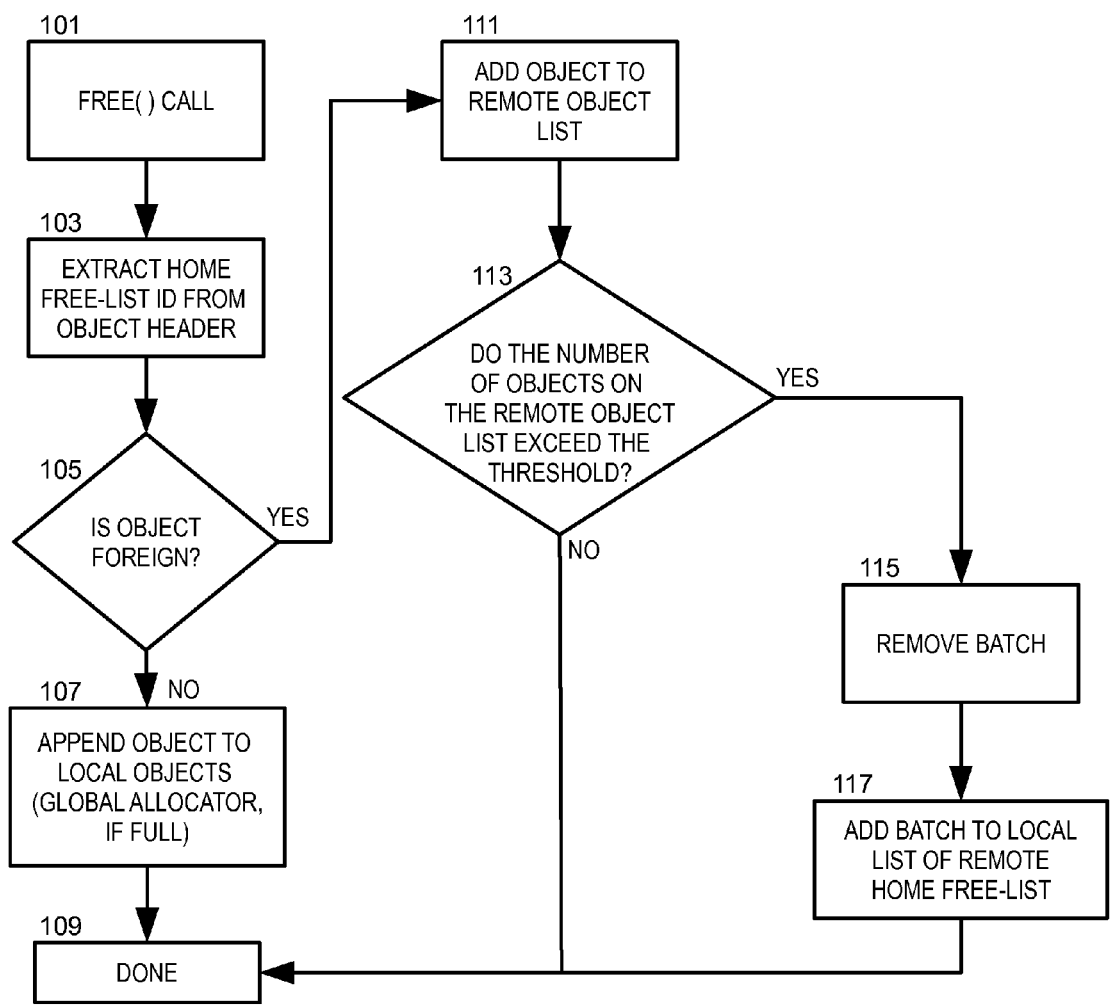
FIG. 1 is a flowchart illustrating a process for freeing objects which may have been allocated on another thread, returning them to their home free-list.

In overview, the present disclosure concerns a memory management system, in a multi-threaded system, for managing objects which may be allocated by threads, then passed to other threads, and then freed by the other threads for re-use. The memory management system can permit use of something which may be termed "shared thread-affinity caches" in which objects allocated by one thread have affinity to return "home" to the thread which originally allocated the object despite being shared with other threads, and can perform well when memory is allocated on one thread and released on another thread. Further, the system can make use of what appear to be, to the threads, conventional calls to allocate memory and to free memory, such as malloc( ) and free( ) by incorporating the enhanced procedures disclosed herein. The system can prevent blocks of memory from migrating from one thread to another, and thus in a multiple-CPU system can inhibit blocks of memory which threads use from moving from one physical CPU to another.

As a preliminary part of the discussion, a brief discussion of terms used throughout is presented. Terms as used herein are intended to be interpreted first, as understood to one of skill in the art at a first level, of thread management within operating systems; and if not interpretable at the first level, then at a second level as understood to one of skill in the art of computer science; and then if not interpretable according to the first level and second level, according to a more general dictionary.

A. Definitions

The claims may use the following terms, which are defined to have the following meanings for the purpose of the claims herein. Other definitions may be specified in this document.

The term "object header" is used herein to denote a series of bytes at the address of the object immediately before the address of the object (from the application's point of view). The object header is used to describe the object.

The term "mutex" is used herein to denote a known mutual exclusion lock, which prevents more than one thread from executing a specified code. A "mutex" can hinder scalability due to contention.

The term "contention" is used herein to denote known behavior when multiple threads attempt simultaneous access to the same address in memory or access the same mutex.

The term "scalability" is used herein to denote a ratio of total throughput when multiple threads are running to the throughput of a single thread running.

The term "false sharing" is used herein to denote when two CPU cores access different addresses but both addresses are on the same cache line and thus treated as contending.

The term "cache line" is used herein to denote resolution of cache addressing. All accesses within a cache line are treated equally by the CPU cache hardware. The size of the cache line is typically 64 bytes.

The term "producer" is used herein to denote an application thread that is creating objects (by allocating blocks of memory from the allocator) and passing them to one or more consumers.

The term "consumer" is used herein to denote an application thread that receives an object from a producer. From the point of view of the allocator, the only consumer thread of interest is the one that handles the object last and results in the object being deleted.

II. Concept

Noting that mutexes are only costly when there is contention, it is safe to use them in a scalable library provided that statistically they rarely exhibit contention. Contended mutex access is considerably more expensive than uncontended mutex lock and unlocking Mutexes can be used to allow "free-lists" of objects to be used by multiple threads, and to achieve good scalability if there is low contention. In order to reduce contention, the system can scale the number of free-list objects by the number of CPUs available to the operating system. Most modern operating systems have a facility to discover the number of CPU cores available. While there may be many more threads in the application, the number running concurrently cannot be more than the number of CPU cores. When a block of memory (that is, an object in the application, which may represent for example an event or message) is passed from one thread to another, such as from producer thread to consumer thread, it is unavoidable to incur some cache misses and there is some possibility of contention as multiple threads must access the same block of memory. However, the system does not compound this by continuing to use the object in the consumer thread which freed the object, but rather returns the object which is freed up by the consumer thread to be reused in the producer thread (or set of threads sharing a free-list). Accordingly, any false sharing in cache lines or other contention is transient and not long-lived. Generally, memory is accessed by the same thread. When an object is passed between threads, it is returned to its home as soon as practical. This also reduces total memory use, as objects are recycled from consumers to producers.

In traditional systems, by comparison, this process occurs in a much more coarse fashion by returning memory to the global allocator when the consumer's free-list is full. Accordingly, the traditional process mixes blocks of memory that are truly local to a thread with blocks that travel from one thread to another, resulting in memory usage patterns that are harder to analyze, less consistent and generally low performing. Using locks to improve performance seems counter-intuitive but it maintains good scalability while giving satisfactory memory usage.

III. Implementation

A static mapping can be established between threads and the fixed-size pool of free-lists, so every thread has a preferred arena, though that may be shared by multiple threads. When allocating, the thread's preferred arena is used. Thus the memory wasted in the free-lists scales with the number of CPU cores.

Memory availability typically scales with the number of CPU cores due, in part, to practical and physical restrictions on how much memory can be used in a machine. More memory requires more CPU cores and vice versa.

With this type of mapping, it is unlikely that all of the running threads are distributed such that each is using a different free-list. Accordingly, there may well be collisions. This can be reduced by increasing the number of free-lists by some multiple of the number of CPU cores, but the number of free-lists and thus memory still scales with the number of CPU cores, not the number of threads. An embodiment may use a thread-local variable to provide a counter that is guaranteed to give even coverage over a number of slices. Using the thread ID is possible, but it is typically no faster than looking up a thread-local variable. The system can be configured such that a thread-local variable gives an even distribution over the low bits by means of a simple counter. This thread local can then be used, modulo the total number of free-lists, to select a free-list from an array. The free-lists can be padded to avoid false sharing, ensuring good scalability when using them. We refer to a thread's "home" free-list object as the one associated with that thread. Each free-list can require a mutex or equivalent to prevent access by multiple threads, because one free-list can be shared between multiple threads. The free-list contains a list of local objects and a list of remote objects (in practice, the free-list may be an indexed data structure such as a map of lists, indexed for example by which remote free-list the remote objects belong to).

For example, the list may be defined as:

```
class FreeList {
    std::list<void*> local_list;
    std::unordered_map<FreeList*,std::shared_ptr<std::list<void*>>> global_lists;
public:
    static FreeList* getThisThreadsHomeFreeList( );
};
```

When allocating, if no object exists on the local_list of the thread, then an object is retrieved from a global allocator pool. (Retrieving an object from a global allocator pool is likely to be expensive, and hopefully a rare case once the free-lists are populated.) The system can request a larger object from the global pool and add an object header to the beginning of the block allocated to denote which free-list the block of memory was allocated from. The object returned to the application/thread which requested the allocation is offset to compensate for this object header. The global allocator will tend to allocate objects that are local to the thread and CPU that the thread is running on. At times this may incur increased cost and contention on the global allocator. If the home free-list of the thread which requested the allocation does have a local object, then the system retrieves that object from the local objects list and returns it to the requesting thread/application.

Figure 2:
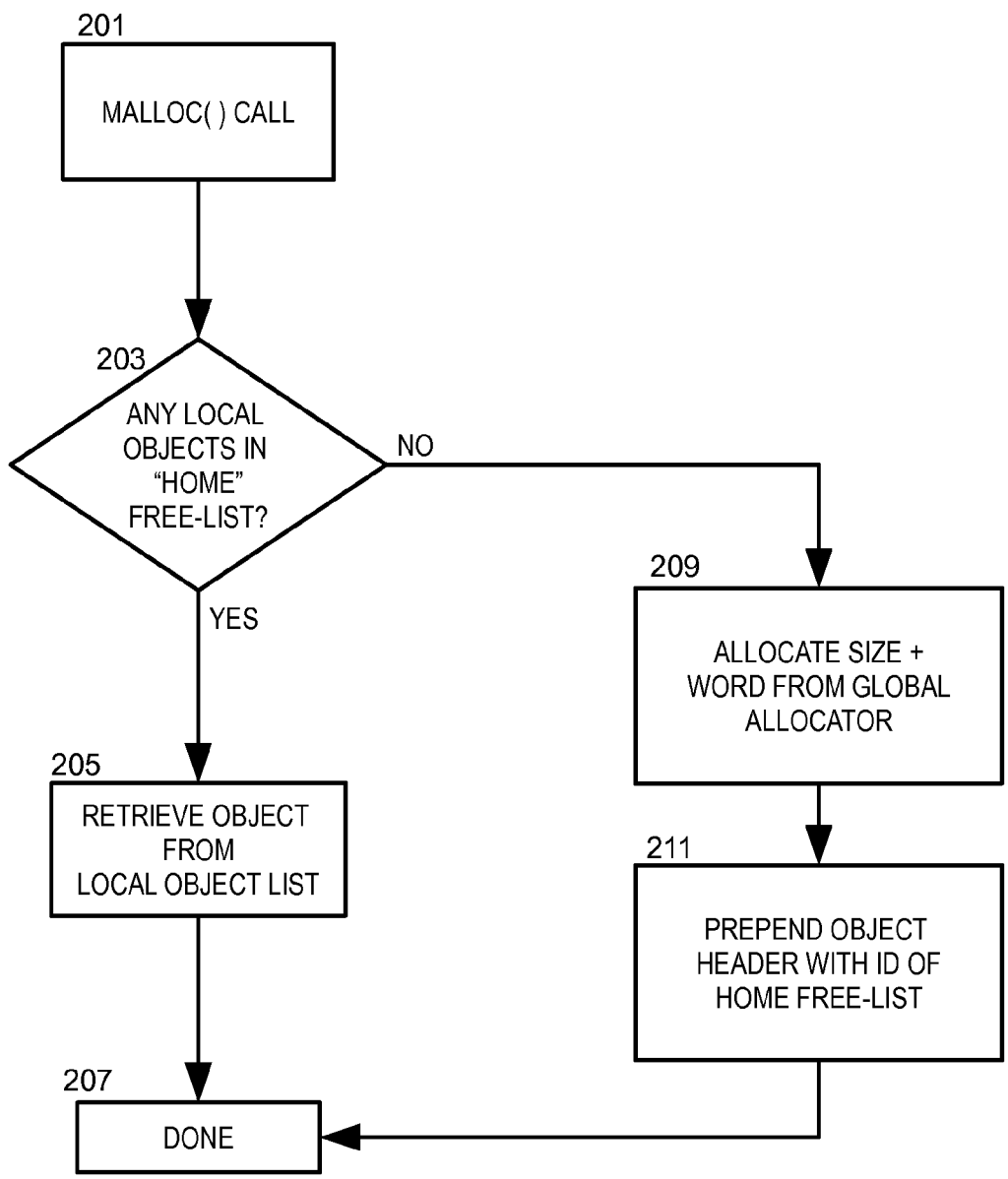
FIG. 2 is a flowchart illustrating a process for allocating objects.

FIG. 2 is a flowchart for the malloc (memory allocation) call routine 201. First it is determined 203 whether any local objects exist in the home free-list of the thread which made the memory allocation request. If so, then an object is retrieved 205 from the local object list and returned for use by the requesting thread, and the malloc routine is complete 207. However, if it is determined 203 that no local objects exist in the "home" free-list, then the memory management system allocates 209 memory having the requested size plus additional space (such as a word) for an object header that will track the originating free-list, from the global allocator, and prepends 211 the object header with the ID of the home free-list of the requesting thread. When using the malloc( ) call routine of FIG. 2, objects can be allocated and freed on the same thread and there is low contention on the "home" free-list.

Figure 3:
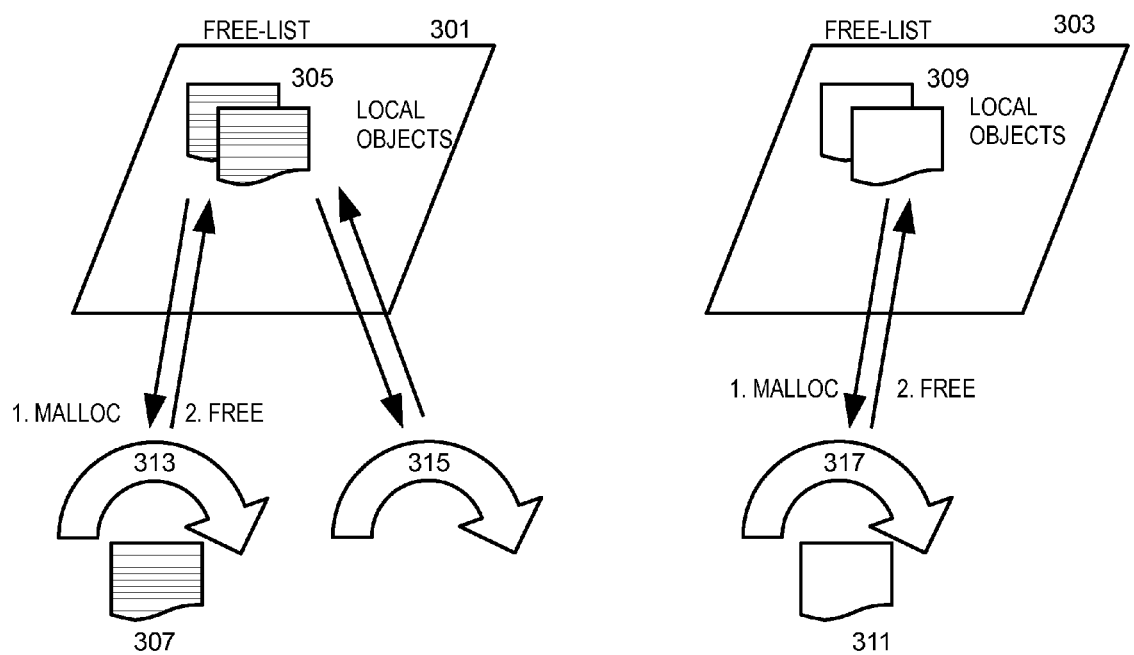
FIG. 3 is a block diagram illustrating two threads accessing objects in isolation from one another.

FIG. 3 is a block diagram illustrating two threads accessing objects in isolation from one another. In this diagram there is no passing of objects from one thread to another. For one thread, the malloc( ) call (denoted as MALLOC) made in an operation 313 from the thread on the left-side of FIG. 3 results in allocating a block of memory by taking from the local free-list's 301 local object list 305 of the requesting thread. The block of memory may be shared between a small number of threads, but should be low contention. The operation 313 can reference the object (now illustrated as 307). The free( ) call (denoted as FREE) made in the operation 313 frees the object 307 back to the thread's local free-list 301. The horizontal hatching of object 307 represents that it originates from the local objects list 305. The local objects list 305 is the "home" of object 307. Other operations, here represented by operation 315, in the thread can be performed which request allocation and freeing of objects.

Similarly for another thread on the right-side of FIG. 3, the malloc( ) call made in an operation 317 results in allocating a block of memory by taking an object from the local free-list's 303 local object list 309. The free( ) call routine made in the operation 317 results in freeing the object 311 back to the thread's local free-list 303. The absence of hatching on the object 311 represents that it originates from the local objects list 309. The local objects list 309 is the "home" of object 311.

When freeing memory, the memory can be freed to the free-list that it was associated with when it was allocated. This results in avoiding the "migration" effect of per-thread free-lists, where CPUs use memory that is not local to the CPU, as it was originally allocated by another CPU and transferred to another CPU core by virtue of being passed from one thread to another by the application. The system avoids false sharing and other cache-harmful consequences of allowing the consumer thread to recycle the memory by reassigning it to the producer's free-list.

The counterpoint to this is that this can require taking locks on the free-lists of "non-local" free-lists, which would cause contention. This can be mitigated by having a relatively small pending transfer list for each free-list. Once there is more than a threshold number of an amount of objects available for a remote free-list, the objects can be transferred, for example, all of the objects in the remote free-list. Waiting for the threshold to be reached allows the system to transfer a plurality of blocks of memory when taking a lock, thus reducing the overall lock contention. The pending transfer list is local to each free-list, so it exhibits low contention. This threshold does not need to be very high.

For example, to reduce mutex contention by a factor of 10, it is only required to hold 10 objects. In the worst case, every free-list would hold 9 blocks for every other remote free-list, resulting in n*(n−1)*9 "wasted" objects, that is, objects which are not free but will not be used by the thread that owns the remote free-list.

However, in practice, typically each consumer thread receives objects from a relatively small number of producer objects. In a typical application, every thread is connected to a relatively small number of other threads in producer-consumer relationships, and generally in operation threads do not exhibit a very large degree of connectivity.

Figure 4:
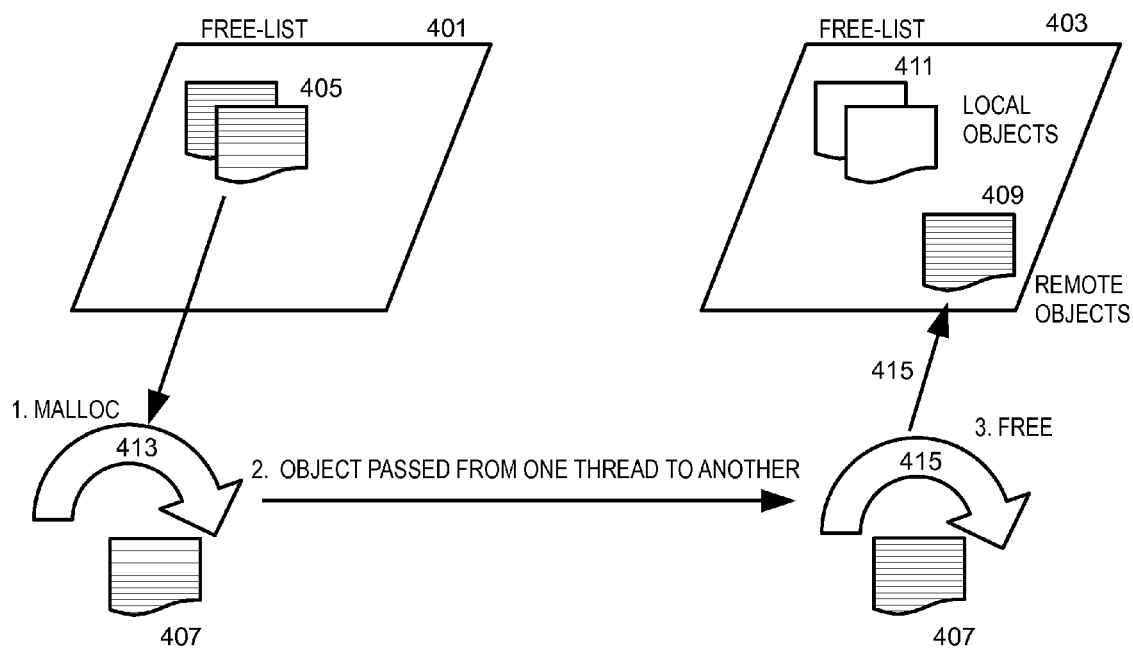
FIG. 4 is a block diagram illustrating threads passing objects from a producer thread to a consumer thread.

FIG. 4 is a block diagram illustrating threads passing objects from a producer thread to a consumer thread. Only a small number of remote objects are present in the consumer thread's free-list. At step 1, an operation 413 in the thread makes an malloc( ) call, which allocates a block of memory by taking an object 407 from the local free-list's 401 local object list 405 (low contention). Then, at step 2, the application passes the object 407 from the producer thread to a consumer thread. At step 3, an operation 415 in the consumer thread makes a free( ) call, which detects that object 407 is a "foreign object" which did not originate at the freeing consumer thread, and places the object (to be freed) into the remote objects list 409 of the freeing consumer thread's free-list 403. Typically, it is expected that there are few objects on the remote object list. Again, the hatching, or lack thereof, represents which "home" each object belongs to. In FIG. 4, when an object is passed from one thread to another, the free-list 403 (the right side of the block diagram) contains foreign objects (illustrated with hatching) in its remote object list 409, but not in its local object list 411. In the case where a batch of objects in the consumer's free-list is ready to be returned, such as triggered by the amount of objects in the free-list reaching a threshold, then the re-cycling operation can begin as shown in FIG. 5.

Figure 5:
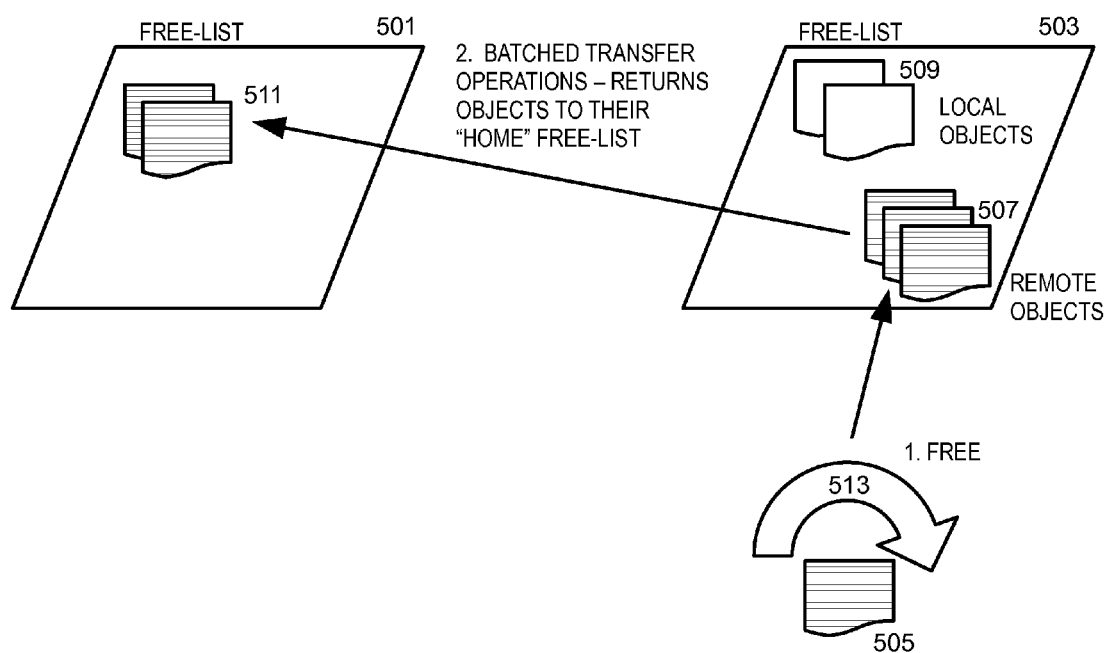
FIG. 5 is a block diagram illustrating intermittent passing of a batch of foreign objects to their home free-list.

FIG. 5 is a block diagram illustrating intermittent passing of a batch of foreign objects from a thread's free-list 503 to their home free-list 501 of the originating thread. This is an infrequent type of operation that may occasionally cause contention. An operation 513 in the consumer thread can make a free( ) to free up object 505. At step 1, the free( ) call routine detects that the object 505 being free is a foreign object, and that the remote objects list 507 has a full batch of events for respective originator's free-list 501. In the diagram, the horizontal hatching, or lack thereof, represents to which "home" each object belongs. At step 2, because the threshold is reached, the batch transfer moves objects back to their original free-list. Although in this illustration there is only one producer free-list 501 to which foreign objects are returned by batch transfer, it should be understood that the remote objects 507 stored in the same remote objects free-list 503 can originate from more than one different producer thread, and thus each remote object 507 will be returned to the respective producer thread which originally issued the allocate call to allocate the object. As previously noted, the remote objects 507 (blocks of memory), illustrated by horizontal hatching, are listed separately from the local objects in the free-list 503 of the consumer thread. Thus, a complete free operation process is shown in FIG. 1.

As described earlier, FIG. 1 is a flowchart that illustrates the procedure of returning remote objects to their respective home free-lists. The free( ) routine is called from a thread to free up a specific object. The free( ) call routine 101 extracts 103 the home free-list ID from the object header of the object 505. The procedure then determines 105 whether the object 505 is foreign. If not, then the object 505 is appended 107 to the local object list 509 and the free( ) call process ends 109. However, if the procedure determines 105 that the object 505 is foreign, then the process adds 111 the object 505 to the remote object list 507. The procedure then determines 113 whether the amount of objects in the remote list have reached a pre-determined threshold. If it is determined 113 that the number of objects on the remote object list 507 does not exceed the specified threshold, then the object merely remains added to the remote object list while waiting for a batch free operation to be performed, and the free( ) call process is complete 109. However, if it is determined 113 that the amount of objects on the remote object list 507 exceeds the specified threshold, then each object in the batch of objects is removed 115 from the remote object list 507 and added 117 to the local list 511 of the free-list 501 of the thread which originally allocated said object.

The more common, low cost cases flow through the left side of the flowchart in FIG. 1, that is, steps 101, 103, 105 (NO), 107 and 109. The more expensive and less frequent cases flow through the right side of the flowchart, that is, steps 103, 105 (YES), 111, 113 (YES and NO), 115, and 117. FIG. 1 can be referred to as illustrating an enhanced free( ) call procedure. In an implementation, the procedure of FIG. 1 can replace a conventional free( ) call procedure.

IV. Examples

Figure 6:
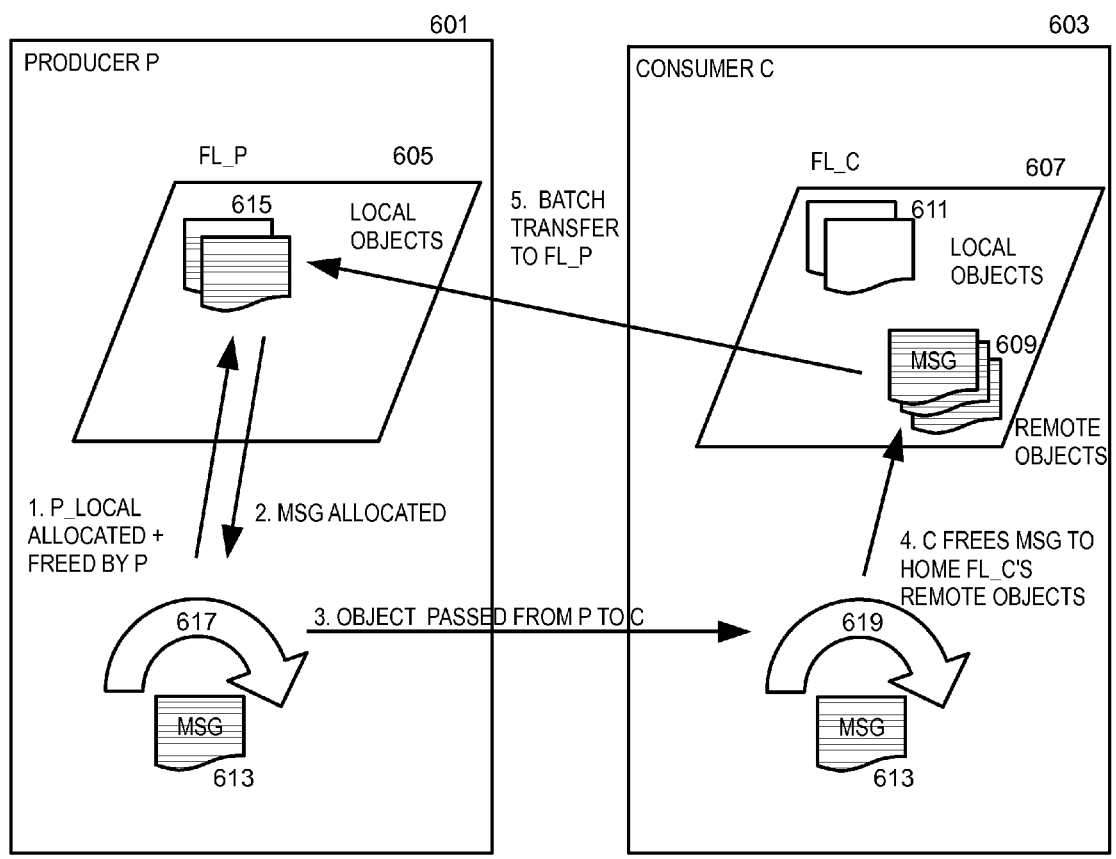
FIG. 6 is a block diagram illustrating threads passing objects from producer to consumer and then passing the objects to their home free-list.

FIG. 6 is a block diagram illustrating an example of passing objects from a producer thread to a consumer thread. The diagram includes a producer thread P 601 and a consumer thread C 603. Each of the threads has different home free-lists and each of the threads has several objects on their respective local object lists. The producer thread P 601 has a free-list 605 called FL_P. The consumer thread C 603 has a free-list 607 called FL_C. In this example, consider that the consumer thread C 603, has 9 objects on its global list (represented by three objects in the remote object list 609) that are to be transferred to the producer thread P's free-list 605.

When the producer thread P 601 generates a message to pass to consumer thread C 603, the producer thread P must allocate memory to do so. It may allocate two objects, P_local for local use, which the producer thread P 601 frees by making a request to free the objects after generating the event, and Msg object 613, which is allocated by producer P 601 but holds the message passed to consumer C 603 and thus is not freed by the producer thread P. Thus, the producer thread P allocates objects by issuing two malloc( ) calls to get two objects P_local and Msg. As discussed above, the objects for each of P_local and Msg each includes a header, which points to (or otherwise identifies) FL_P (the free list of the producer thread which originally allocated both of these objects).

The local objects 605 of the free list FL_P 605 of the producer P 601 may be laid out in memory as follows (assuming each object is 16 bytes long; in practice, different object sizes would be handled by different FreeList objects, and the appropriate FreeList object picked for a given object size, but this is omitted for simplicity, and using buckets for objects of different sizes is a well-established technique of memory allocators):

| P_local = 0x10008 | |
|---|---|
| Msg = 0x10020 | |
| 0x10000 (Object header of P local) | <Pointer to FL_P> |
| 0x10008 (First word of P_local) | P_local_part1 |
| 0x10010 (Second word of P_local) | P_local_part2 |
| 0x10018 (Object header of Msg) | <Pointer to FL_P> |
| 0x10020 (First word of Msg) | Msg_Part1 |
| 0x10028 (Second word of Msg) | Msg_Part2 |

It is important to note that both of the objects, P_local and Msg, are on the same cache line. In the conventional system, if an object using addresses 0x10018-0x1002f were passed to another thread such as a consumer thread, the object when freed by the consumer thread would go to the free-list of the consumer thread. If the consumer thread used those addresses while 0x10000-0x10017 were used by the producer thread, then while the program would operate correctly, the two threads would cause false sharing, significantly impacting performance.

In comparison, in the present system, in step 1, when the P_local object (which was originally allocated by the producer thread P) is freed by an operation 617 of the producer thread P making a request to free the object, the object header of the P_local object can be compared to the home free-list for that thread to determine whether the object being freed is local or remote. In this case, they are the same, FL_P, so P_local can be returned to the local list of FL_P.

```
P_local=malloc(16);                    // returns 0x10008
void malloc(size_t sz) {
// homeFreeList = <FL_P >
    FreeList *homeFreeList = FreeList::getThisThreadsHomeFreeList( );
// lock our local home list, FL_P, as multiple threads may access it
    ScopedLock scopedLock(homeFreeList);
// if we have objects on our local list (assume we do)
    if(homeFreeList->local_list.size( )>0) {
// pop one (0x10000)
        void *objectHeader=homeFreeList->local_list.pop( );
// set the object header (0x10000) to point to FL_P
        *((void**)(objectHeader)) = homeFreeList;
// return the address of the application's object (0x10008)
        return &objectHeader[1];
    } else { ... }
}
// P_local = 0x10008
free(P_local);
// obj = 0x10008 (P_local)
void free(void *obj) {
// homeFreeList = <FL_P>
    FreeList *homeFreeList = FreeList::getThisThreadsHomeFreeList( );
// lock our local home list, FL_P, as multiple threads may access it
    ScopedLock scopedLock(homeFreeList);
// objectHeaderPtr = 0x10000
    void *objectHeaderPtr = obj-1;
// objectHeader = <void* Pointer to FL_P>
    void *objectHeader = *((void **)objectHeaderPtr);
// true
    if((*(Freelist**)objectHeaderPtr) == homeFreeList) {
// places the 'real' address of P_local, 0x10000, onto FL_P's local_list.
        homeFreeList->local_list.push_back(objectHeaderPtr);
    } else { ... }
}
```

At step 2, the operation 617 of the producer thread P issues a request to allocate an object, which returns one object from the local objects 615 for use by the producer thread P. The object header of the P_local object which is returned to the thread identifies the free list FL_P 605 of the producer thread P, which is where this object originated (i.e., was originally allocated). The operation 617 will use the object as a message Msg 613.

At step 3, the operation 617 of the producer thread P 601 passes the message held in Msg 613 to the consumer thread C 603. An operation 619 of the consumer thread C 603 may allocate an additional object, C_local, for example, in order to process the message (not shown for clarity in the diagram). The additional object is allocated from consumer thread C's home free-list 607, and more particularly from FL_C's local list 611. This additional object which was originally allocated by the consumer thread C will have an object header identifying FL_C, so when freed, the free procedure will place the object onto FL_C's local list.

At step 4, when the operation 619 of the consumer thread C 603 has processed the Msg 613, which is an object that originated from the producer thread P, the consumer thread C will make a call to free the object 613. The function to free the object, which responds to the call (such as free( ) to free the object, examines the object header of the object to determine whether the object is local or remote. If the object is local, then the object is simply returned using conventional techniques to the local objects 611 in the free list FL_C 607 of the consumer thread 603. However, in this case, the object header of Msg 613 points to FL_P, the free list FL_P of the procedure thread P 601. This is not the same as the free list of the thread which requested to free the object, i.e., it is not equal to FL_C, so the object is determined to be a remote object. Instead of being placed into the free list FL_C of local objects 611 of the consumer thread C 603 which freed the object, the object 613 is placed on FL_C's remote object list, where it will wait to be transferred back to its "home" (the free list of the thread which originally allocated the object). Continuing on, the function to free the object will then determine whether the remote object list of FL_C has a full batch of messages (such as by meeting a threshold), and when the batch is full, at step 5 the function to free the object will pop preferably all of the objects in the batch from FL_C's remote list 609, and transfer the objects to the free lists identified in the object headers (in this example, all are returned to FL_P's local list 615), taking locks as desirable. The objects can be added to the free lists by being linked to the produce thread P's local list 615 of free objects 605, for example.

The following is an example code path for freeing a remote object, Msg 613 on consumer thread C 603, provided for illustration:

```
// Msg = 0x10020                              - Step 4 of FIG. 6
free(Msg);
// obj = 0x10020 (Msg)
void free(void *obj) {
// homeFreeList = <FL_C>
    FreeList *homeFreeList = FreeList::getThisThreadsHomeFreeList( );
// lock our local home list, FL_C, as multiple threads may access it
    ScopedLock scopedlock(homeFreelist);
// objectHeaderPtr = 0x10018
    void *objectHeaderPtr = obj-1.;
// objectHeader = <void* Pointer to FL_P>
    void *objectHeader = *((void**)objectHeaderPtr);
// false ( FL_P != FL_ C )
    if((*(FreeList**)objectHeaderPtr) == homeFreeList) {
    ...
} else {
// objFreeList = <FL_P>
    FreeList *objFreeList = *(FreeList**)(objectHeaderPtr);
// remote_list = FL_C.remote_list[FL_P]
    auto remote_ list = homeFreeList->remote_objects[objFreelist];
// places the 'real' address of Msg, 0x10018, onto FL_C's remote_list[FL_P]
    remote_list->push_back(objectHeaderPtr);
// if we have a batch                         - Step 5 of FIG. 6
    if(remote_list->size( ) > 10) {
// transfer FL_C's remote_list[FL_P] to a local batch object
    std::list<void*> batch;
    batch.swap(*remote_list);
// unlock homeList (FL_C); we will no longer touch it
    scopedLock.release( );
// lock the remote list, FL_P (this could cause contention, but done rarely)
    ScopedLock remoteLock(objFreeList);
// for each object in the batch
    for(auto batch_obj : batch) {
// add the batch onto objFreeList (FL _P)'s local_list
    objFreeList->local_list.push_back(batch_obj);
    }
  }
}
```

Note that in this typical case of the same consumer-producer thread pair, a number of cycles may exist (P_local cycles) between the application thread and the free-list's local object list. This should be low contention. Msg objects cycle from FL_P's local list, to the producer thread P, to the consumer thread C, to FL_C's remote object list, back to FL_P's local object list. The cross-thread transfer from FL_C's remote list to FL_P's local list in this case can be batched to amortize synchronization cost. The application may be making similar optimizations in a queue between producer thread P 601 and consumer thread C 603.

An additional concrete example implementation will now be discussed in connection with FIG. 7. The procedures discussed above conveniently may be implemented on the computer system of FIG. 7.

Figure 7:
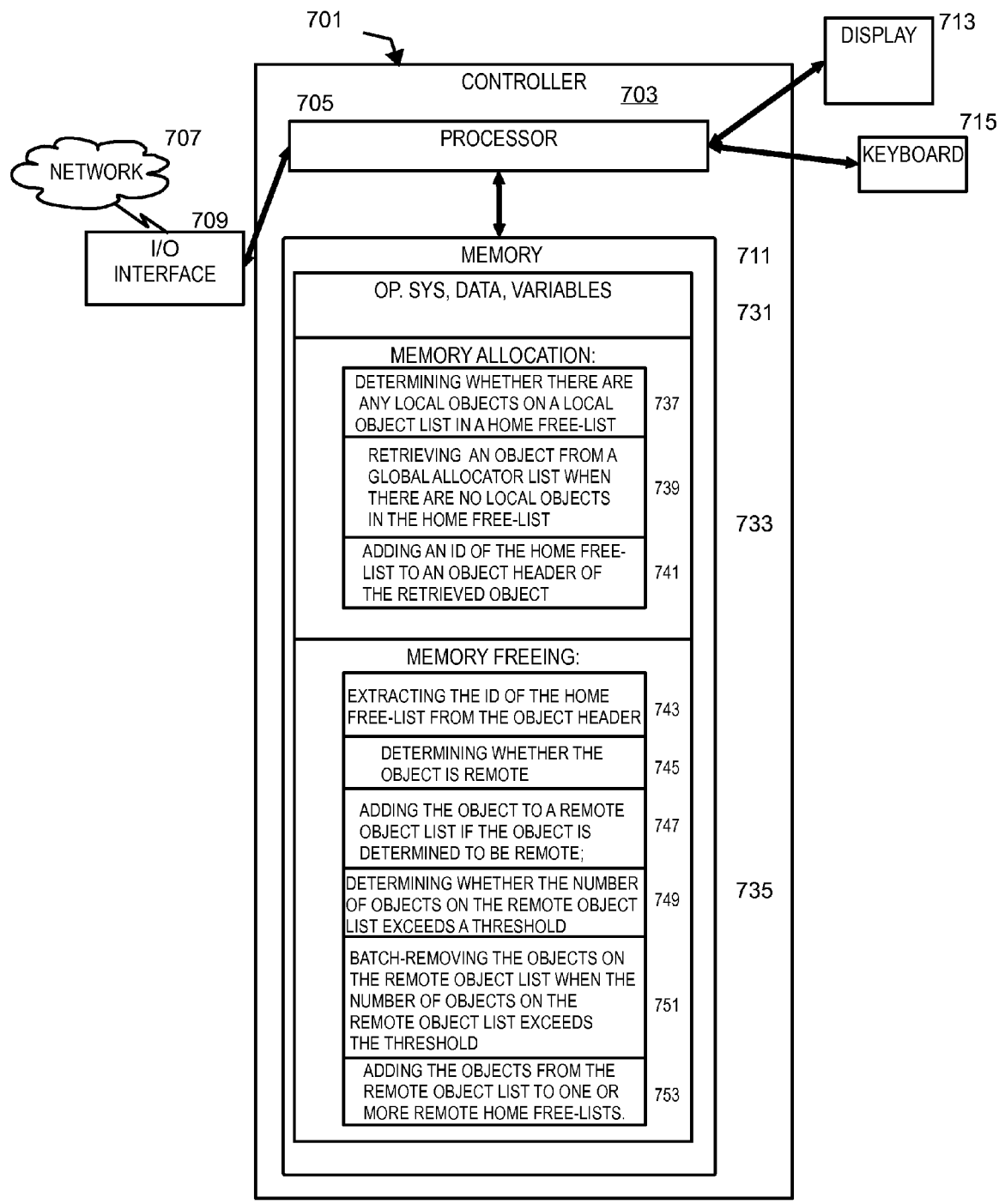
FIG. 7 is a block diagram that depicts relevant portions of a computer system.

Referring now to FIG. 7, a block diagram illustrating relevant portions of a computer system 701 will be discussed and described. The computer system 701 may include one or more controllers 703, a processor 705, an input/output (i/o) interface 709 for communication such as with a network 707, a memory 711, a display 713 (optional), and/or a user input device such as a keyboard 715. Alternatively, or in addition to the keyboard 715, a user input device may comprise one or more of various known input devices, such as a keypad, a computer mouse, a touchpad, a touch screen, and a trackball. The display 713 may present information to the user by way of a conventional liquid crystal display (LCD) or other visual display, and/or by way of a conventional audible device (e.g., a speaker) for playing out audible messages. Portions of the computer system 701 are well understood to those of skill in this area and have been omitted to avoid obscuring the discussion.

The processor 705 may comprise one or more microprocessors and/or one or more digital signal processors. The memory 711 may be coupled to the processor 705 and may comprise a read-only memory (ROM), a random-access memory (RAM), a programmable ROM (PROM), and/or an electrically erasable read-only memory (EEPROM). The memory 711 may include multiple memory locations for storing, among other things, an operating system, data and variables 731 for programs executed by the processor 705; computer programs for causing the processor 705 to operate in connection with various memory allocation functions 733 such as determining 737 whether there are any local objects on a local object list in a home free-list; retrieving 739 an object from a global allocator list when there are no local objects in the home free-list; and adding 741 an ID of the home free-list to an object header of the retrieved object; and computer programs for causing the processor 705 to operate in connection with various memory freeing functions 735 such as extracting 743 the ID of the home free-list from the object header; determining 745 whether the object is remote; adding 747 the object to a remote object list if the object is determined to be remote; determining 749 whether the number of objects on the remote object list exceeds a threshold; batch-removing 751 the objects on the remote object list when the number of objects on the remote object list exceeds the threshold; and adding 753 the objects from the remote object list to one or more remote home free-lists. The computer programs may be stored, for example, in ROM or PROM and may direct the processor 705 in controlling the operation of the computer 701. Each of these functions is considered in more detail herein, to the extent that it is not detailed elsewhere in this document.

The user may invoke functions accessible through the user input device such as the keyboard 715. The user input device may comprise one or more of various known input devices, such as a keyboard (715, illustrated) and/or a pointing device, such as a mouse; the keyboard 715 may be supplemented or replaced with a scanner, card reader, or other data input device; and the pointing device may be a mouse, touch pad control device, track ball device, or any other type of pointing device.

Responsive to manual signaling from the user input device represented by the keyboard 715, in accordance with instructions stored in memory 711, and/or automatically upon receipt of certain information via the i/o interface 709, the processor 705 may direct the execution of the stored programs.

The processor 705 can be programmed for performing a memory allocation function and/or memory freeing function which is complementary to the memory allocation function. The memory allocation operation and the memory freeing operation may conveniently be provided as enhancements to malloc( ) and free( ) calls, such that threads can continue to perform their usual operations as well as to make their usual memory allocation and free calls which result in execution of the enhanced memory allocation and free functions discussed herein.

As part of the memory allocation function, the processor 705 may be programmed for determining 737 whether there are any local objects on a local object list in a home free-list of the requesting thread, in response to a request by a thread to allocate memory. The processor 705 may be programmed for retrieving 739 an object from a global allocator list when there are no local objects in the home free-list; the global allocator list has a list of globally free memory available for use, such as by threads. The processor 705 may be programmed for adding 741 an ID of the home free-list of the thread which is allocating the object to an object header of the retrieved object which is retrieved from the global allocator list; the object which has the object header that identifies the free-list of the thread is returned for use by the thread in response to the request to allocate the object. Though not illustrated, when there are local objects on the local object list in a home free list of the requesting thread, one of the local objects is returned for use by the thread in response to the request to allocate the object.

As part of the memory freeing function, in response to a request by a thread to free an object which is currently memory-allocated to the thread, the processor 705 may be programmed for extracting 743 the ID of the home free-list from the object header. The processor 705 may be programmed for determining 745 whether the object is remote, using the ID which is extracted; if the home free-list identified in the object header is the same as the free-list of the thread which is freeing the object, then the object is not remote and can simply be added to the local object free list of the requesting thread. The processor 705 may be programmed for adding 747 the object to a remote object list of the requesting thread, on the other hand, if the object is determined to be remote. The remote objects are not removed back to their respective home threads until a predetermined amount of objects are included in the remote object free list, so that they can all be handled in a batch; this reduces the number of operations and mutex issues. Accordingly, the processor 705 which is handling the memory freeing function may be programmed for determining 749 whether the number of objects on the remote object list exceeds a threshold. The processor 705 may be programmed for batch-removing 751 the objects on the remote object list of the requesting thread when the number of objects on the remote object list exceeds the threshold, and for adding 753 the objects from the remote object list to one or more remote home free-lists, which can be determined from the respective object heads of the remote objects in the remote object list.

As will be understood in this field, besides the functions discussed above, the memory 711 can include other miscellaneous information in a misc. database, not shown, along with the usual temporary storage and other instructions for other programs not considered herein.

The computer 701 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 705, memory 711, a disk drive and/or removable storage medium are referred to as "computer-readable storage media" and provide non-transitory storage of computer programs and data.

It should be understood that FIG. 7 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

V. Miscellaneous Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for memory management of objects which represent memory in a multi-threaded operating system have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for memory management of objects which represent memory in a multi-threaded operating system, comprising:
   in response to a request by a consumer thread to free an object, which is allocated by a thread of the multi-threaded operating system which is the consumer thread or a different thread, back to a free list of the objects:
      determining, by the processor, whether the object, in the request by the consumer thread to free the object, is identified as being remote to the consumer thread;
      adding, by the processor, the object to a local object free list of the consumer thread, when the object is determined to not be remote;
      adding, by the processor, the object to a remote object free list of the consumer thread, wherein the object on the remote object free list of the consumer thread represents a foreign object that is freed and which is not available for re-use by the consumer thread, when the object is determined to be remote;
      determining, by the processor, whether an amount of objects on the remote object free list of the consumer thread exceeds a threshold;
      when the number of objects on the remote object free list of the consumer thread is determined to not exceed the threshold, bypass removing the remote object;
      when the number of objects on the remote object free list of the consumer thread is determined to exceed the threshold:
         batch-removing, by the processor, the objects from the remote object free list of the consumer thread; and adding, by the processor, the objects from the remote object free list of the consumer thread to a home free-list of a producer thread which originally allocated the objects, the producer thread is different from the consumer thread.

2. The method of claim 1, further comprising:
in response to a request by the producer thread to allocate memory:
  determining, by the processor, whether there is any object in the local object free list of the producer thread, wherein the object in the local object free list represents a local object available to the producer thread;
  when there is determined to be an object on the local object free list of the producer thread, returning, to the producer thread, the object on the local object free list of the producer thread, for use by the producer thread in response to the request to allocate memory;
  when there is determined to be no object on the local object free list of the producer thread:
    retrieving, by the processor, an object from a global allocator list which memorizes globally free memory;
    adding, by the processor, an identifier to an object header of the retrieved object from the global allocator list, wherein the identifier identifies the local object free list of the producer thread;
    returning, to the consumer thread, the object from the global allocator list, for use by the producer thread in response to the request to allocate memory; and
    using, by the producer thread, the object returned from the request to allocate memory.

3. The method of claim 2, wherein
the object which is returned in response to the request to allocate memory is passed from the producer thread to the consumer thread, and then is the subject of the request by the consumer thread to free the object.

4. The method of claim 1, wherein a home free-list for each of a plurality of threads, including the consumer thread and the producer thread, in the multi-threaded operating system contains a local object free list and a remote object free list.

5. The method of claim 1, wherein the request to free the object is a free memory request which is complementary to a request to allocate memory.

6. The method of claim 1, further comprising, prior to freeing the object, the consumer thread receiving the object which is shared from the producer thread.

7. A computer system comprising:
a memory;
a processor cooperatively operable with the memory, and configured to, based on instructions stored in the memory,
in response to a request by a consumer thread to free an object, which is allocated by a thread of the multi-threaded operating system which is the consumer thread or a different thread, back to a free list of the objects:
  determine whether the object, in the request by the consumer thread to free the object, is identified as being remote to the consumer thread;
  add the object to a local object free list of the consumer thread, when the object is determined to not be remote;
  add the object to a remote object free list of the consumer thread, wherein the object on the remote object free list of the consumer thread represents a foreign object that is freed and which is not available for re-use by the consumer thread, when the object is determined to be remote;
  determine whether an amount of objects on the remote object free list of the consumer exceeds a threshold;
  when the number of objects on the remote object free list of the consumer thread is determined to not exceed the threshold, bypass removing the remote object;
  when the number of objects on the remote object free list of the consumer thread is determined to exceed the threshold:
    batch-remove the objects from the remote object free list of the consumer thread; and
    add the objects from the remote object free list of the consumer thread to a home free-list of a producer thread which originally allocated the objects, the producer thread is different from the consumer thread.

8. The computer system of claim 7, wherein the processor is further configured to:
in response to a request by the producer thread to allocate memory:
  determine, by the processor, whether there is any object in the local object free list of the producer thread, wherein the object in the local object free list represents a local object available to the producer thread;
  when there is determined to be an object on the local object free list of the producer thread, return, to the producer thread, the object on the local object free list of the producer thread, for use by the producer thread in response to the request to allocate memory;
  when there is determined to be no object on the local object free list of the producer thread:
    retrieve an object from a global allocator list which memorizes globally free memory;
    add an identifier to an object header of the retrieved object from the global allocator list, wherein the identifier identifies the local object free list of the producer thread;
    return the object from the global allocator list, for use by the producer thread in response to the request to allocate memory; and
    use, by the producer thread, the object returned from the request to allocate memory.

9. The computer system of claim 8, wherein the processor is further configured that
the object which is returned in response to the request to allocate memory is passed from the producer thread to the consumer thread, and then is the subject of the request by the consumer thread to free the object.

10. The computer system of claim 7, wherein the processor is further configured that a home free-list for each of a plurality of threads, including the consumer thread and the producer thread, in the multi-threaded operating system contains a local object free list and a remote object free list.

11. The computer system of claim 7, wherein the request to free the object is a free memory request which is complementary to a request to allocate memory.

12. The computer system of claim 7, wherein, prior to freeing the object, the consumer thread receives the object which is shared, from the producer thread.

13. A non-transitory computer readable medium comprising executable instructions for a method for memory management of objects which represent memory in a multi-threaded operating system, the instructions being executed by a processor to perform:

in response to a request by a consumer thread to free an object, which is allocated by a thread of the multi-threaded operating system which is the consumer thread or a different thread, back to a free list of the objects:
    determining whether the object, in the request by the consumer thread to free the object, is identified as being remote to the consumer thread;
    adding the object to a local object free list of the consumer thread, when the object is determined to not be remote;
    adding the object to a remote object free list of the consumer thread, wherein the object on the remote object free list of the consumer thread represents a foreign object that is freed and which is not available for re-use by the consumer thread, when the object is determined to be remote;
    determining whether an amount of objects on the remote object free list of the consumer thread exceeds a threshold;
    when the number of objects on the remote object free list of the consumer thread is determined to not exceed the threshold, bypass removing the remote object;
    when the number of objects on the remote object free list of the consumer thread is determined to exceed the threshold:
        batch-removing the objects from the remote object free list of the consumer thread; and
        adding the objects from the remote object free list of the consumer thread to a home free-list of a producer thread which originally allocated the objects, the producer thread is different from the consumer thread.

14. The non-transitory computer readable medium of claim 13, further comprising:
in response to a request by the producer thread to allocate memory:
    determining whether there is any object in the local object free list of the producer thread, wherein the object in the local object free list represents a local object available to the producer thread;
    when there is determined to be an object on the local object free list of the producer thread, returning, to the producer thread, the object on the local object free list of the producer thread, for use by the producer thread in response to the request to allocate memory;
    when there is determined to be no object on the local object free list of the producer thread:
        retrieving an object from a global allocator list which memorizes globally free memory;
        adding an identifier to an object header of the retrieved object from the global allocator list, wherein the identifier identifies the local object free list of the producer thread;
        returning, to the consumer thread, the object from the global allocator list, for use by the producer thread in response to the request to allocate memory; and
    using, by the producer thread, the object returned from the request to allocate memory.

15. The non-transitory computer readable medium of claim 14, wherein
the object which is returned in response to the request to allocate memory is passed from the producer thread to the consumer thread, and then is the subject of the request by the consumer thread to free the object.

16. The non-transitory computer readable medium of claim 13, wherein a home free-list for each of a plurality of threads, including the consumer thread and the producer thread, in the multi-threaded operating system contains a local object free list and a remote object free list.

17. The non-transitory computer readable medium of claim 13, wherein the request to free the object is a free memory request which is complementary to a request to allocate memory.

18. The non-transitory computer readable medium of claim 13, further comprising, prior to freeing the object, the consumer thread receiving the object which is shared from the producer thread.

\* \* \* \* \*